US008508359B2

(12) United States Patent
Piccolo, III

(10) Patent No.: US 8,508,359 B2
(45) Date of Patent: Aug. 13, 2013

(54) METHOD AND SYSTEM FOR WIRELESS CONFIGURATION, CONTROL, AND STATUS REPORTING OF DEVICES IN A FIRE ALARM SYSTEM

(75) Inventor: Joseph Piccolo, III, Fitzwilliam, NH (US)

(73) Assignee: SimplexGrinnell LP, Westminster, MA (US)

( * ) Notice: Subject to any disclaimer, the term of this patent is extended or adjusted under 35 U.S.C. 154(b) by 441 days.

(21) Appl. No.: 12/972,151

(22) Filed: Dec. 17, 2010

(65) Prior Publication Data

US 2012/0154141 A1 Jun. 21, 2012

(51) Int. Cl.
*G08B 1/00* (2006.01)
*G06F 17/40* (2006.01)

(52) U.S. Cl.
USPC ....................... 340/539.11; 702/182; 340/506

(58) Field of Classification Search
USPC ................... 340/506, 517, 577, 10.1, 815.66, 340/539.11; 365/222; 702/182; 315/250
See application file for complete search history.

(56) References Cited

U.S. PATENT DOCUMENTS 6,426,697 B1 7/2002 Capowski et al.
6,661,340 B1 * 12/2003 Saylor et al. .................. 340/517
8,369,967 B2 * 2/2013 Hoffberg et al. ................ 700/80
2003/0234732 A1 * 12/2003 Rhodes et al. ........... 340/870.16
2005/0052927 A1 * 3/2005 Barrieau ....................... 365/222
2005/0128097 A1 * 6/2005 Piccolo et al. ............. 340/691.1
2009/0091466 A1 4/2009 Sendrowski, Jr.
2009/0309740 A1 * 12/2009 Savage, Jr. .................... 340/577
2010/0191507 A1 * 7/2010 Eiden et al. .................. 702/182
2010/0287606 A1 * 11/2010 Machani ........................... 726/7
2010/0315224 A1 12/2010 Orsini et al.

* cited by examiner

*Primary Examiner* — Benjamin C Lee
*Assistant Examiner* — Sigmund Tang
(74) *Attorney, Agent, or Firm* — Brinks Hofer Gilson & Lione

(57) ABSTRACT

A method and system for configured one or more fire alarm system devices in a fire alarm system are disclosed. The fire alarm system includes the fire alarm system devices, a fire alarm panel, and a wireless handheld device. The fire alarm system devices communicate with the fire alarm panel via a first communications interface (such as a wired communications interface), and the wireless handheld device communicates with the fire alarm panel via a second communications interface (such as a wireless communications interface). In operation, the fire alarm control panel receives an indication from one of the fire alarm system devices of a user input. In response, the fire alarm panel sends a communication (such as a form) to the wireless handheld device. In response to the communication, the wireless handheld device sends a response to the fire alarm control panel (such as including information in the form). The fire alarm panel may then update its memory with the information sent from the wireless handheld device in order to control the operation of the fire alarm system device.

19 Claims, 4 Drawing Sheets

METHOD AND SYSTEM FOR WIRELESS CONFIGURATION, CONTROL, AND STATUS REPORTING OF DEVICES IN A FIRE ALARM SYSTEM

BACKGROUND

Typical fire alarm systems include a number of fire alarm system devices, which includes, but is not limited to fire detectors (including smoke detectors), pullstations, notification appliances, positioned throughout a building (and/or campus). Signals from those fire alarm system devices are monitored by a system controller, such as a fire alarm control panel ("FACP"). The FACP, upon sensing an alarm condition, sends commands to one or more notification appliances to alert occupants in one section of the building, in multiple sections of the building, or in all sections of the building. Notification appliances can output a visual notification, an audible notification, or both. Examples of notification appliances include, but are not limited to strobes, horns, speakers, and the like. Notification appliances are typically connected across common power lines on a notification appliance circuit ("NAC").

The typical fire alarm system centers control at the FACP, with configuration, monitoring status, and control of the fire alarm system devices being performed at the FACP. This focus of control at the FACP has its advantages, particularly in a large fire alarm system. However, this focus also has its disadvantages. For example, in configuring the fire alarm system, the technician must return to the FACP to change or obtain information about the fire alarm system devices. In particular, the configuration of one or more of the fire alarm system devices in many fire alarm systems can only be performed at the FACP. For example, assigning addresses, custom labels, groupings of fire alarm devices, are performed at the FACP. The technician uses the user interface and special configuration software at a computer resident at the FACP to configure the one or more fire alarm system devices. This setup may make it difficult, particularly when the technician is at the fire alarm devices. However, performing the configuration of the fire alarm device may prove difficult. Thus, a need exists to better configure a fire alarm system

SUMMARY

The present embodiments relate to methods and systems for configuring fire alarm system devices in a fire alarm system. In one aspect, a fire alarm control panel that communicates with one or more fire alarm system devices, and a wireless handheld device is provided. The fire alarm control panel includes at least one communications interface (and may include multiple communications interfaces, such as a wired communications interface and a wireless communications interface). The fire alarm control panel further includes a memory configured to store configuration information. And, the fire alarm control panel includes a controller that is configured to: receive an indication, via the communications interface, of a user input from a fire alarm system device; send at least one communication (such as a communication that includes a form), via the at least one communications interface, to a wireless handheld device; receive a response to the communication, via the communications interface, from the wireless handheld device, the response including information (such as information that is different from or not included in the form sent); and update the memory with at least a part of the information.

For example, the controller may receive a communication from one of the fire system alarm devices that an operator provided input to the fire alarm system device. The fire alarm control panel may identify at least one aspect of the fire alarm system device that sent the communication, such as a unique address associated with the fire alarm system device, a type of the fire alarm system device (e.g., a strobe, horn, etc.), etc. The fire alarm control panel may then select a form, and/or populate the form, based on the identified aspect. For example, the controller may access the memory based on the identified aspect of the fire alarm system device to determine whether previous configuration information was entered for the fire alarm system device. The form may then be populated with the previous configuration information, and sent to the wireless handheld device. In this way, previously entered configuration information may be changed or updated by the wireless handheld device. Or, if the fire alarm system device has not been previously configured, new configuration information may be entered via the wireless handheld device. Moreover, the fire alarm control panel may access the memory based on the identified aspect to determine which form, from a plurality of forms stored in the memory, to send to the wireless handheld. For example, a "strobe" form may be accessed from the memory if the fire alarm system device is identified as a strobe device, and sent to the wireless handheld device. The fire alarm control panel may receive the form back from the wireless handheld device, with the received form including information that was different from or not included in the form that was sent to the wireless handheld device. For example, the information in the received form may include information that is changed from the form that the fire alarm control panel sent to the wireless handheld device. Or, the information may include information that was not included in the form that the fire alarm control panel sent to the wireless handheld device. Some or all of the information in the received form may then be stored in the memory of the fire alarm control panel.

In another aspect, a handheld wireless device that communicates with a fire alarm control panel is provided. The handheld wireless device includes a wireless communications interface, a user interface, and a controller. The controller is configured to: receive at least one form, via the wireless communications interface, from a fire alarm control panel; output the at least one form on the user interface; input configuration information via the at least one form; and send the configuration information to the fire alarm control panel.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION

Figure 1:
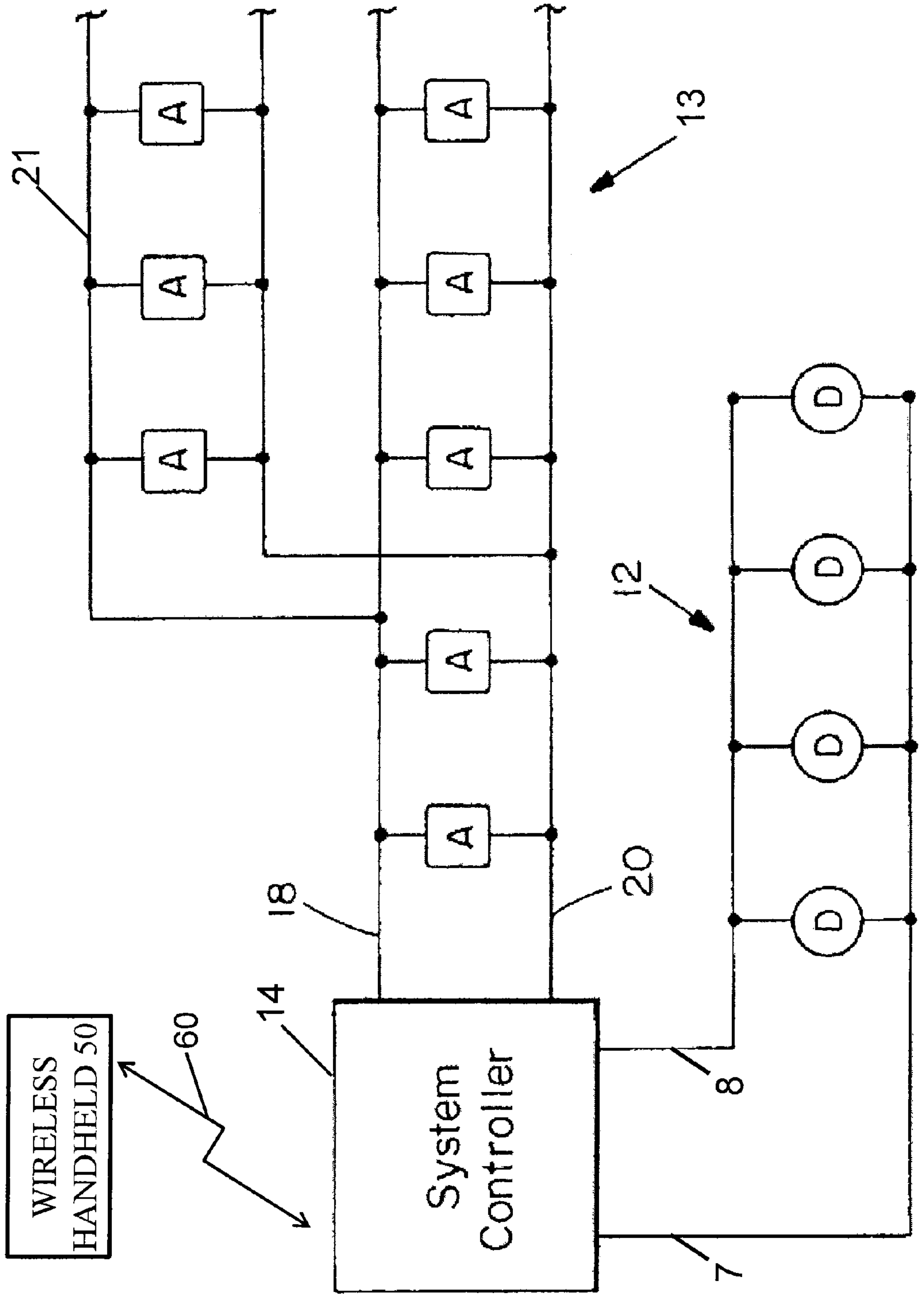
FIG. 1 is a schematic diagram illustrating a fire alarm system.

A system embodying one example of the present invention is illustrated in FIG. 1. The system includes a system controller 14 (such as a fire alarm control panel (FACP)), alarm condition detectors D, and alarm system notification appliances A. The system may be configured in different ways, such as depicted in FIG. 1.

FIG. 1 further depicts one appliance circuit 13. However, a greater number of appliance circuits may be used in the alarm system. FIG. 1 further depicts one detector circuit 12. However, a greater number of detector circuits may be used in the alarm system. The appliance circuit 13 and the detector circuit 12 include one or more wires (such as 7 and 8, 18 and 20) that emanate from the system controller 14.

The example in FIG. 1 depicts that all of the notification devices are coupled across a pair of power lines 18 and 20, although this is not necessary for carrying out the invention. Lines 18 and 20 may carry communications between the system controller 14 and the notification devices A on appliance circuit 13. Lines 6 and 7 may carry communications between the system controller 14 and detectors D on detector circuit 12. Alternatively, the communication line to the notification devices may be separate from the power line. The communications channel may comprise, for example, a wireless link, a wired link or a fiber optic link.

The appliance circuits may have alarm condition detectors D, alarm system notification appliances A, or both alarm condition detectors D and alarm system notification appliances A. For example, FIG. 1 depicts detector circuit (DC) 12 that includes alarm condition detectors D. As still another example, FIG. 1 depicts notification appliance circuit (NAC) 13 that includes alarm system notification appliances A. As still another example, the alarm system may include a detector/notification appliance circuit (D/NAC) that includes both alarm condition detectors D and alarm system notification appliances A. Again, FIG. 1 is merely for illustration purposes. Fewer or greater numbers of appliance circuits may be used, fewer or greater NACs may be used, fewer or greater DCs may be used, and, one or multiple D/NACs may be used.

The system may further include one or more single-ended stub circuits 21, such as shown in FIG. 1. The use of stub circuits 21, also referred to as "T-tapping", provides a number of advantages, reducing the wire material and installation costs, and allowing for increased NAC wiring distances.

The system controller 14 may monitor the alarm condition detectors D. When an alarm condition is sensed, the system controller 14 may signal the alarm to the appropriate notification appliances A through the one or more appliance circuits. Notification devices may include, for example, a visual alarm (such as a strobe), an audible alarm (such as a horn), or a combination thereof. Also, a speaker for broadcasting live or prerecorded voice messages and a strobe may be combined into a single unit (SN device). A visible indicator (such as an LED) may be provided on any of the above-described notification appliances A, with the LED also being controlled by the system controller 14. For example, the LED may be operated under NAC commands (described below) such that the LED blinks every time the notification appliance A is polled.

The system controller 14 may use one or more commands to signal the alarm to the appropriate notification appliances A. Examples of commands issued for a system with addressable notification appliances are disclosed in U.S. Pat. No. 6,426,697, which is hereby incorporated by reference in its entirety. Further, the system controller 14 may send one or more commands relating to diagnostics, status, or other non-alarm type events. For example the system controller 14 may send a command related to the identification, the configuration, and/or the status of the notification appliances A. The notification appliances A may respond in kind.

Different parts of the fire alarm system may be configured. For example, the system controller 14 may be configured. One way to configure the system controller 14 is via a user interface resident at or integrated with the fire alarm panel 14. An operator may use the user interface in order to program various aspects of the system controller 14, such as assigning unique addresses to the various fire alarm device, assigning custom labels to various fire alarm devices and/or grouping of fire alarm devices. The fire alarm control panel may further configure other aspects of the fire alarm device including output coding, detector sensitivities, detection modes and operation. Another way to configure the system controller 14 is via a wireless handheld device 50. The wireless handheld device 50 may be physically located remotely from the system controller 14, such as near or proximate to one of the fire alarm devices. The wireless handheld device 50 may wirelessly communicate with the system controller 14 using a wireless communication link 60 in order to configure one or more aspects of the system controller 14, such as assigning custom labels to various fire alarm devices and/or grouping of fire alarm devices, as discussed in more detail below.

Likewise, one, some, or all of the fire alarm system devices, including, but not limited to the alarm condition detectors D, pullstations, and notification appliances A, relay modules, zone modules, and addressable device, may be configured. For example, the system controller 14 may remotely program one or more of the fire alarm system devices. In particular, the system controller 14 may use one or more of the following: software configuration tools; fire alarm panel displays and keypads or similar user interfaces; service port command; external computer interfaces; Internet interfaces; and modem or other remote connection interfaces. Or, the wireless handheld device 50 may remotely program one or more of the fire alarm system devices. In practice, the wireless handheld device 50 may be proximate to the fire alarm system device that the wireless handheld device 50 is programming (e.g., the operator holding the wireless handheld device 50 may be standing near the fire alarm system device). The wireless handheld device 50 may use the same tools as the system controller 14 in programming one or more of the notification devices A. More specifically, the wireless handheld device 50 may include a user interface to input information (such as via a form) to program one or more of the fire alarm system devices, and wirelessly communicate the commands to the system controller 14. In turn, the system controller 14 relays the information input to the one or more of the fire alarm system devices in order to program the one or more of the fire alarm system devices. In this way, the wireless handheld device 50 may be proximate to the fire alarm system device, yet indirectly program the fire alarm system device via the system controller 14, as discussed in more detail below.

As still another example, the alarm condition detectors D and/or the notification devices A may be locally programmed directly. The direct programming may occur in one of a variety of means, including but not limited to: configuring a switch on the notification device A, jumpers, optical signaling (e.g. TV remote control, blinking flashlight, light bulb or other light source, laser pointers, breaking optical beam), a magnet tapped against the device, radio frequency (RF) tags, sound signaling (e.g. ultrasonic tones, touchtones) etc.

As discussed above, communication signals to and from the system controller 14 may be multiplexed onto the device's power line. Alternatively, communications signals may be on a communication line that is separate from the power line. For example, a fiber optic cable link or a wireless connection can be utilized. Alternatively, or in addition, the notification device A may directly communicate with the system controller 14 using for example, optical signaling (for example, an LED, an infrared emitter, etc.). The notification device A may also communicate using other means, such as RF tag reading or audio (e.g., ultrasonic, chirps, beeps, prerecorded or synthesized voice, etc.)

Figure 2:
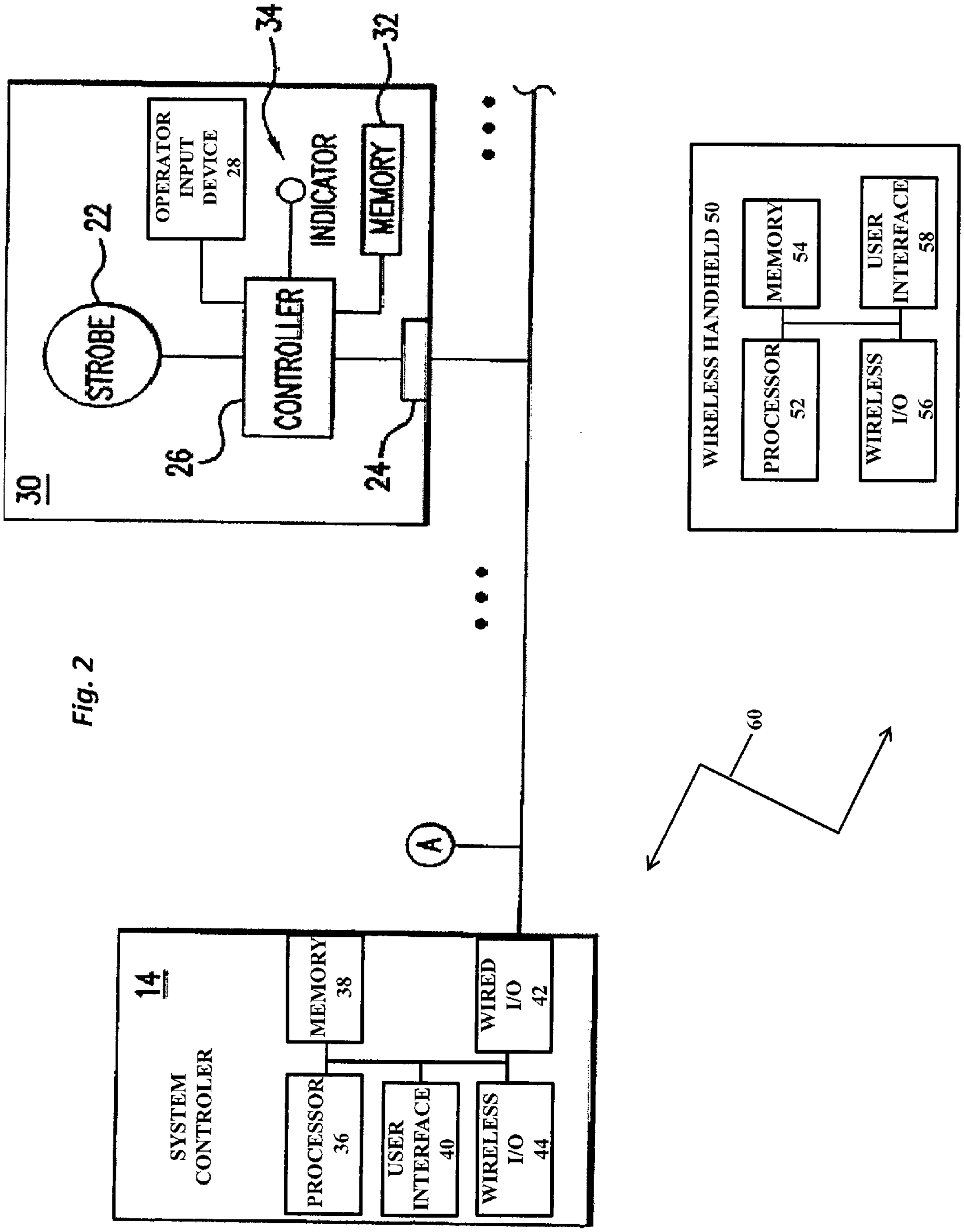
FIG. 2 is a schematic diagram of the system of FIG. 1, further illustrating details of an embodiment of the present invention.

As discussed above, examples of the notification devices A include, but are not limited to, strobes, horns, speakers, and the like. These examples of the notification appliances A are merely for illustration purposes only. Other notification appliances A may be used. FIG. 2 is a schematic diagram of the system of FIG. 1, using a strobe device 30 as an example of a notification appliance A. For simplicity, the two-line network of FIG. 1 is shown with a single line. The system controller 14 includes a processor 36, a memory, 38, a user interface 40, wired I/O 42, and a wireless I/O 44. The wired I/O 42 is configured to be a wired network interface for the notification devices A.

The wireless I/O 44 may comprise a wireless transceiver and may be configured to communicate wirelessly with one or more devices. As discussed in more detail below, wireless I/O may enable wireless communication between the system controller 14 and the wireless handheld 50. The wireless communication may be entirely wireless (such as a direct wireless communication between the system controller 14 and the wireless handheld 50, or wireless communication using one or more wireless access points) or may be wireless part wireless (such as by using part wired communication and part wireless communication, including but not limited to sending the wired communication via the Internet). Various wireless protocols may be followed. For example, the system controller 14, using wireless I/O 44, may be a part of a Wireless Local Area Network (WLAN), linking the system controller 14 with another device, such as wireless handheld device 50. Examples of a wireless distribution method include, without limitation, spread-spectrum or orthogonal frequency-division multiplexing (OFDM) radio. The WLAN gives the operator, using the wireless handheld device 50, the mobility to move around a building or complex within a local coverage area, still be connected to the network, and still be able to communicate with the system controller 14. The system controller 14 and the wireless handheld device 50 within a WLAN may operate using a peer-to-peer (P2P) network or a bridge network. The peer-to-peer (P2P) network allows wireless devices to directly communicate with each other. Wireless devices within range of each other can discover and communicate directly without involving central access points. The bridge network uses a bridge, such as an access point, in order for the two wireless devices to communicate with each other. One example of a WLAN is Wi-Fi. Wi-Fi is based on the IEEE 802.11 standards. As another example, the system controller 14, using wireless I/O 44, may communicate with a mobile device (such as a cellular phone or the like) via radio communications over a cellular network.

Alternatively, the system controller 14 may communicate with the wireless handheld device 50 via a networked connection. The fire alarm control panel may communicate with the wireless handheld device 50 via a network connection to the Internet. In particular, the wireless handheld device 50 may wireless communicate with an access point that may connect with the Internet. In the case where the system controller 14 acts as a server (such as hosting web site functions), the wireless handheld device 50, using its browser, may act as a client a submit an HTTP request message to the system controller 14 acting as a server. The HTTP request may include a request for a form for download. As discussed in more detail below, the wireless handheld device 50 may fill out part or all of the form in order to configure a fire alarm system device. The wireless handheld device 50 may then send the form back to the system controller 14 acting as a server. Alternatively, the wireless handheld device 50 may access a server that is separate from the system controller 14. The wireless handheld device 50 may access a form on the server, and fill out the form. The system controller 14 may thereafter access the filled out form on the server.

Strobe device 30 comprises a network interface 24, a controller 26, a strobe 22, a memory 32, an indicator 34, and operator input device 28. The strobe device 30 connects to the network via the network interface (communication connection) 24. The controller 26, such as a microcontroller or hardwired logic, receives commands from and sends data to the system controller 14. For example, the system controller 14 may send a command to activate the strobe 22 of the strobe device 30. As another example, the system controller 14 may send a request for a response from the strobe device 30, the request requesting the status of part or all of the strobe device 30. Or, the system controller 14 may send a command to configure the strobe device 30, as discussed in more detail below.

When the strobe device 30 receives the command to activate the strobe 22, the strobe 22 flashes. The strobe 22 may comprise a Xenon flash tube or an LED and drive circuitry, or other high-brightness light source. Although shown separately, the memory 32 may be integrated with the controller 26. The indicator 34, such as a flashing LED, may indicate a current configuration of the strobe device 30, for example, upon command from the system controller 14, upon a local manual command such as a pushbutton (not shown), on a periodic basis, always, or upon some other event.

Strobe device 30 further includes operator input device 28. Operator input device 28 may comprise a device which is configured to receive a manual input from an operator. For example, operator input device 28 may include a switch (e.g., a test switch or a magnet switch), or other manual input device. The operator may provide a manual input to operator input device 28, such as by flipping a test switch, hitting a magnet switch with a magnet, or the like. Or, operator input device 28 may comprise a device which is configured to receive a wireless input from an operator. For example, operator input device 28 may include an optical sensor (e.g., an infrared sensor) that is configured to receive an optical input from an operator that is proximate to the strobe device 30. The operator may provide a wireless input to operator input device 28, such as by sending an infrared signal (such as a Bluetooth signal).

Upon receiving an input, the operator input device 28 may send a signal to controller 26 that an input has been received. In turn, the controller 26 may send a communication to the system controller 14 indicating to the system controller 14 that an operator is proximate to the strobe device 30.

As discussed above, the fire alarm system may further include wireless handheld device 50. The wireless handheld device 50 generally comprises a mobile computing device and may include a smartphone, a personal information manager (PIM) with a wireless interface, an ultra-mobile PC, a tablet computer (such as an iPad®), or the like. A smartphone is a mobile phone that provides more advanced computing ability and connectivity than a contemporary basic feature phone. The smartphone includes the functionality of a handheld computer integrated within a mobile telephone. An example of a smartphone is the Apple iPhone or Android. An example of the PIM is the iPod Touch.

The wireless handheld device 50 includes a processor 52, memory 54, user interface 58, and a wireless I/O 56. The processor 52 works in combination with wireless I/O 58 in order to communicate with system controller 14. The wireless handheld device 50 may be configured, via software resident in memory 54, to access one or more aspects of the system controller 14 remotely. For example, the wireless handheld device 50 may access the user interface 40 of the fire alarm panel 14. In this way, the user interface 58 of the wireless handheld device 50 may be used to duplicate the user interface 40 of the system controller 14. The user interface 58 may include a display, a keyboard (such as a standard QWERTY keypad or a reduced keypad), a tablet device, or the like. Further, the wireless handheld device 50 may be configured to accept commands via user interface 58. For example, the user may enter commands via a texted-based command line interface on user interface 58. As another example, the user may enter commands via a touch screen interface on user interface 58.

The memory 54 may include software configuration tools in order for the wireless handheld device 50 to configure the system controller 14 and/or the fire alarm notification devices. The software configuration tools resident in the wireless handheld device 50 may be the same as the software configuration tools resident at the system controller 14. Or, the software configuration tools resident in the wireless handheld device 50 may be different from the software configuration tools resident at the system controller 14, such as including a different user interface.

Figure 3:
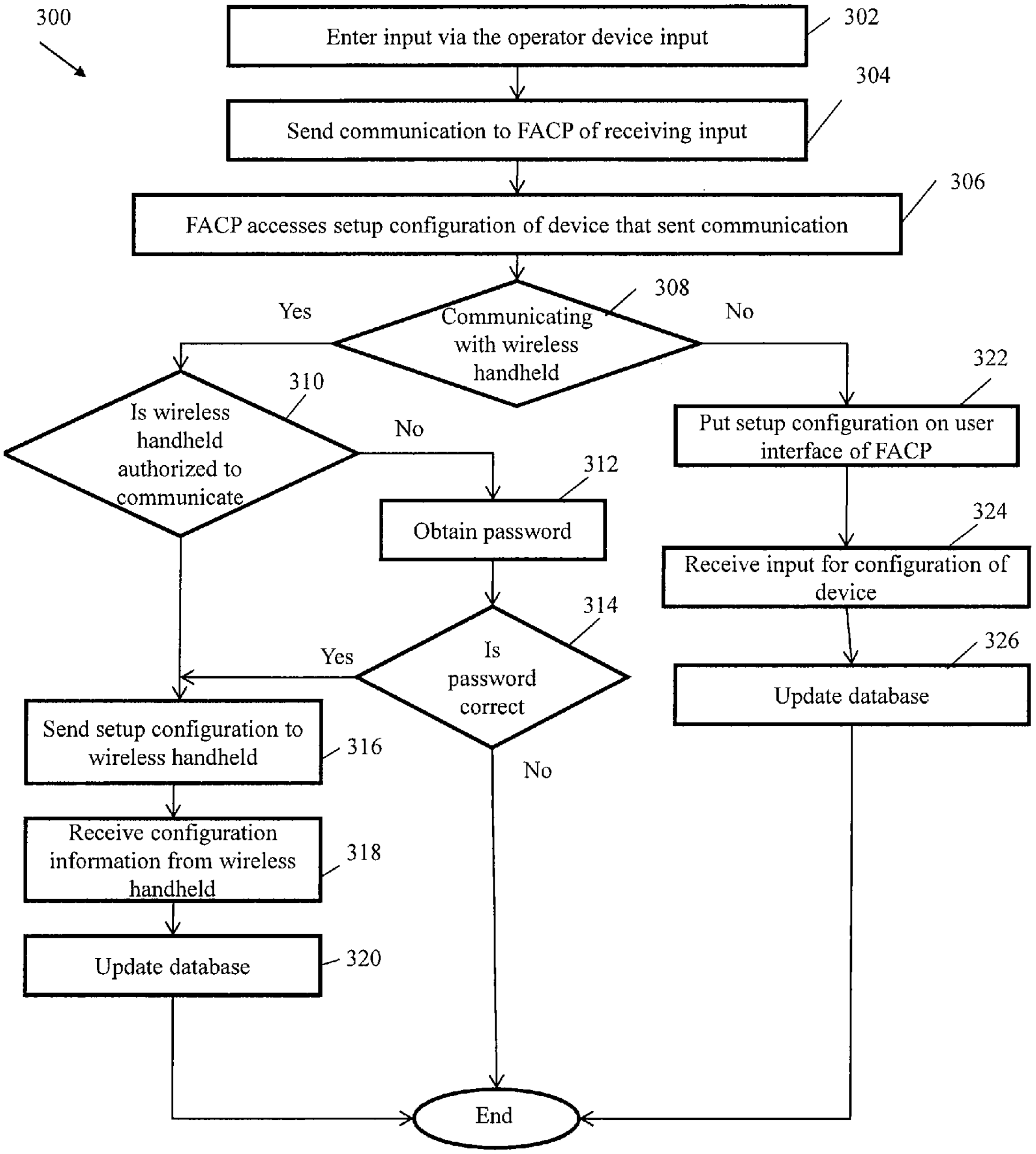
FIG. 3 is an example of a flow chart in which a command a fire alarm system device is configured.

FIG. 3 is a flow chart 300, according to which an exemplary fire alarm system device may be configured according to at least one embodiment of the invention. At 302, input is manually entered via the operator input device 28. In response, at 304, the fire alarm system device sends a communication to the system controller 14 indicating that input has been received. The system controller 14 receives the communication from the fire alarm system device and may process the communication. For example, the system controller 14 may determine that part of the communication (such as one or more fields in the communication) indicate that the fire alarm system device has received an input from an operator, indicating that the operator is at, near, or proximate to the fire alarm system device. Further, the system controller 14 may analyze other aspects of the communication. One aspect may include an identifier identifying the fire alarm system device, such as an address of the fire alarm system device.

At 306, the system controller 14 accesses the setup configuration, which may include the default configuration or the last stored configuration of the device that sent the communication. Using the identified aspect of the fire alarm system device (such as the address), the system controller 14 may access a database in memory 38 that stores previously entered setup configuration information. In the instance where the fire alarm system device has not been previously configured, the system controller 14 may either retrieve no configuration information; or alternatively, the system controller 14 may retrieve standard the default configuration information in the event that a fire alarm system device has not been previously configured. For example, the fire alarm system device may comprise a strobe device. In the event that the strobe device has not been previously configured, the system controller 14 may access the configuration information of a standard profile of a strobe device.

Further, the system controller 14 may access a form to send to the wireless handheld device. The form may be selected from a plurality of forms available. For example, a form may be assigned to each of the types of fire alarm system devices, such as a form for a strobe, a horn, etc. Or, a form may be selected based on whether the fire alarm device has been previously configured or not previously configured. Once the form is selected, the form may be populated with the configuration information retrieved from the memory, or may be populated with the standard profile.

At 308, the system controller 14 determines whether it is communicating with wireless handheld 50. One way in which the system controller 14 may determine whether it is communicating with the wireless handheld is by sending a poll request. If not, at 322, the previously retrieved setup configuration information is output to user interface 40. For example, the user interface 40 may display the selected form that includes various fields, such as unique address number, device type, device label, groupings (including one or more assigned NAC groupings), etc. As discussed above, the displayed form may be populated with the retrieved setup configuration information. If no setup configuration information has been retrieved, the user interface 40 may display the form that includes the various fields without the information populated. At 324, the operator may provide configuration information via the user interface 40. Examples of configuration information include unique address number, custom label, groupings, etc. At 326, the database housed in memory 38 may be updated with the configuration information input.

If the system controller is communicating with a wireless handheld, at 310, it is determined whether the wireless handheld is authorized to communicate with the system controller. Though not required, for security purposes, it may be beneficial to determine whether the wireless handheld is entitled to provide configuration information to the system controller. If it is determined that the wireless handheld is not authorized to communicate, at 312, a password may be obtained from the wireless handheld. The password may be manually entered by the operator of the wireless handheld. In the case where the password is previously stored in the wireless handheld, the password may be transmitted automatically from the wireless handheld to the system controller. If the password is incorrect, the flow chart ends.

Alternatively, the system controller 14 may include a table of authorized wireless handheld identifiers. The communication from wireless handheld may include a field or a header identifying the wireless handheld (such as a telephone number of the wireless handheld). The system controller may compare the field identifying the wireless handheld with entries in the table of authorized wireless handhelds to determine whether the handheld should be authorized.

If the wireless handheld is authorized to communicate, at 316, the system controller may send the setup configuration information that was previously accessed. For example, the system controller 14 may send the selected form that includes various fields, such as unique address number, device type, device label, groupings (including one or more assigned NAC groupings), etc. The form may then be displayed on user interface 58 of wireless handheld 50. The displayed form on user interface 58 may be populated with the retrieved setup configuration information. If no setup configuration information has been retrieved, the user interface 58 may display the form that includes the various fields without the information populated. Alternatively, the wireless handheld device may have the form previously stored in memory 54 so that transmission of the form from the system controller 14 is unnecessary.

The operator of the wireless handheld 50 may enter configuration information via the user interface 58. The configuration information entered may include, for example, a custom label identifying each fire alarm system device (such as "strobe in $3^{rd}$ floor conference room"). Or, the configuration information may include grouping information, a unique address, etc. At 318, the wireless handheld 50 may sends the entered configuration information for receipt by the system controller 14. At 320, the database housed in memory 38 is updated with the configuration information sent by the wireless handheld.

Further, a tag or other identifier may be associated with the configuration information that is stored in the database. The tag or other identifier may indicate the wireless handheld device that entered the information for record-keeping purposes. In this way, the operator may simply go to one of the fire alarm system devices and trigger an input at the fire alarm system device (so that the fire alarm system device may indicate to the system controller which fire alarm system device the operator is accessing). Once the system controller identifies the fire alarm system device, the system controller can display the current status or current configuration of the fire alarm system device on the system controller's own display, or can send the current status or current configuration of the fire alarm system device to the wireless handheld device for display on the wireless handheld device. In this system configuration, the operator may, for example, go to each fire alarm system device in turn, and enter fire alarm system device configuration settings (such as a custom label). And, the operator may simply verify the configuration of each device, simplifying system checkout.

Figure 4:
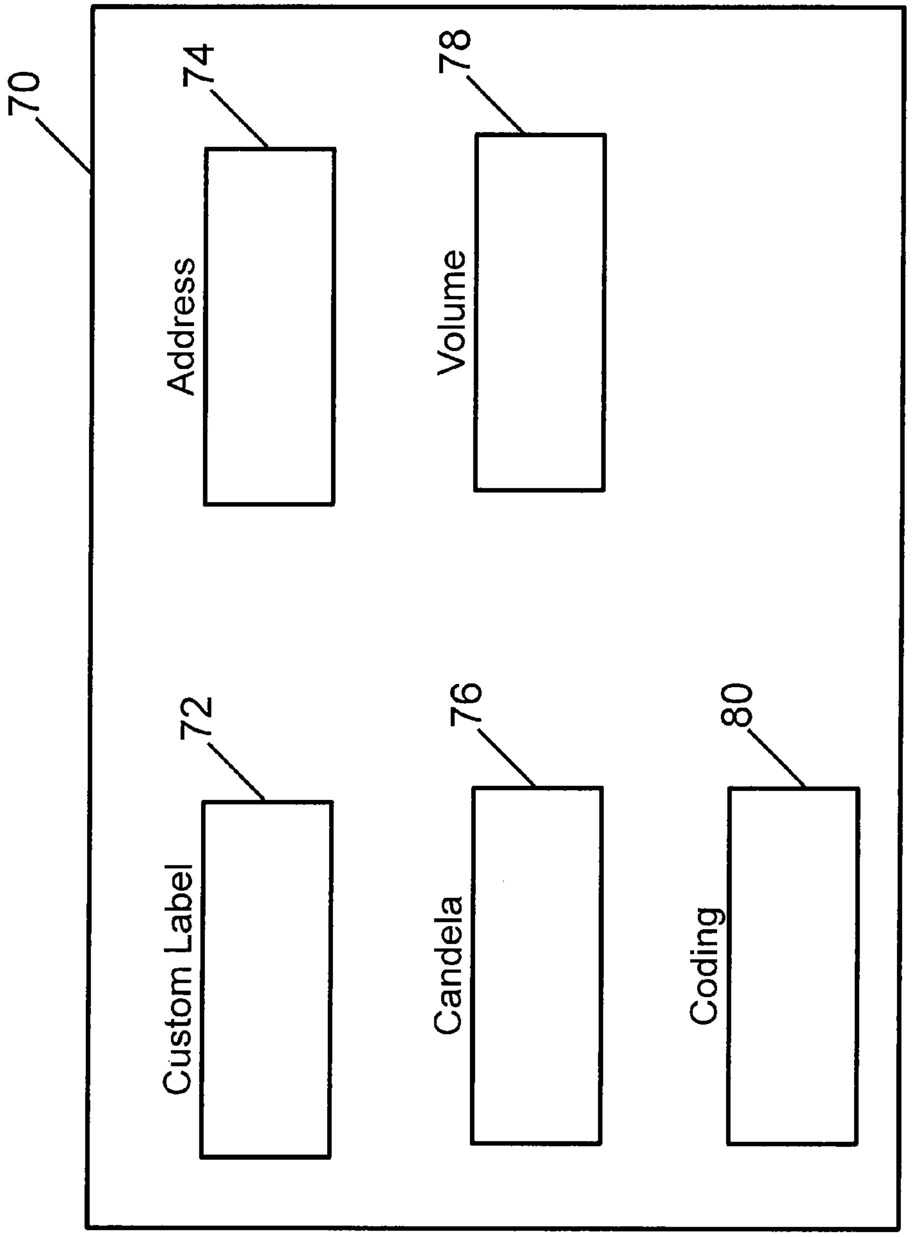
FIG. 4 is an example of a form sent to the wireless handheld device.

An example of the form 70 is depicted in FIG. 4. The form may include one or more fields, such as fields 72, 74, 76, 78 and 80. The fields may relate to the selected form. For example, the notification appliance may be identified as a strobe. So that, the form selected and sent to the wireless handheld 50 includes fields for configuring a strobe. The fields may include, but are not limited to the custom label 72, the address 74, the candela setting 76, the volume 78, and the coding (e.g., pattern of the strobe) 80. The fields depicted in form 70 are merely for illustration purposes.

If strobe has been configured previously, the form may be populated with the fields of the previous configuration. Or, the form 70 may include default values for one, some, or all of the fields 72, 74, 76, 78 and 80. The operator may enter input to fill out one, some or all of the fields 72, 74, 76, 78 and 80, or change the value in one, some or all of the fields 72, 74, 76, 78 and 80 (if a value is already listed in the field). In this way, the notification appliance A may receive an input, such as a magnet tap on operator input device 28. In response to the magnet tap, the notification appliance A may send a communication to the system controller 14 indicating that an input has been received. The system controller may identify the particular type of device, select the form based on the identified type of device, and populate the form depending on whether the identified device has been previously configured or whether default values are provided.

The input may be in the form of a command line input (such as the operator tapping the field and typing in a value). Or, the input may be in the form of a pull-down menu. For example, a field having a discrete number of entries for the operator to choose from. The operator may use a mouse (or other pointing device) in order to pull down the menu and select one of the entries. The discrete number of entries may be preprogrammed. For example, the identified device may have a discrete number of allowable settings. In the case of a strobe, the strobe may be identified as a multi-candela strobe with a predetermined candela settings (such as 15, 30, 75 or 110cd). The pull-down menu may be populated with each of the predetermined candela settings for the operator to select. Alternatively, the discrete number of entries may be tailored at the system controller 14. For example, there may be predetermined descriptions for the custom labels (such as "lobby east", "lobby west", "conference room A", etc.). The discrete number of entries may be stored in memory 38 of system controller 14. When the form is sent to the wireless handheld 50, the pull-down menu for custom label 72 may be populated with the discrete number of entries. Further, the system controller may subsequently review the operator input to the form to determine whether to accept or reject the input. For example, if the operator selects the same custom label for a particular notification appliance, the system controller 14 may reject the input, notify the operator of the discrepancy, or both.

As discussed above, the user input at the notification appliance A (such as the magnet tap) may initiate the communication from the notification appliance A to the system controller 14, and in turn initiate the sending of the form to the wireless handheld 50. Alternatively, the ordering of the communications may be different. The operator may fill out or modify the form at the wireless handheld 50. For example, the operator may select one of the custom labels from a list, and send the selected custom label to the system controller 14. Then, the operator may provide a user input at the notification appliance A (such as the magnet tap). In response to the magnet tap, the notification appliance A may send a communication to the system controller 14. The system controller 14 may thereafter tie the custom label as identified at the wireless handheld 50 with the notification appliance A that received the magnet tap.

While the invention has been described with reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A fire alarm control panel for controlling a plurality of fire alarm system devices, the fire alarm control panel comprising:

- a first communications interface configured to communicate with the plurality of fire alarm system devices;
- a second communications interface;
- a memory configured to store configuration information; and
- a controller configured to:
  - receive an indication, via the first communications interface, of a user input from a fire alarm system device;
  - send at least one communication responsive to receiving the indication, via the second communications interface, to a wireless handheld device proximal to the fire alarm system device;
  - receive a response, via the second communications interface; from the wireless handheld device, the response including configuration information entered by a user; and
  - update the memory with at least a part of the configuration information.

2. The fire alarm control panel of claim 1, wherein the at least one communication sent to the wireless handheld device comprises a form; and

- wherein the response comprises a modified form, the modified form having been modified by including information entered by the user.

3. The fire alarm control panel of claim 2, wherein the first communications interface comprises a wired communications interface;

- wherein the second communications interface comprises a wireless communications interface;

wherein the controller is configured to receive the indication of the user input from the fire alarm system device via the wired communications interface; and wherein the controller is configured to send the form to the wireless handheld device via the wireless communications interface.

4. The fire alarm control panel of claim 2, wherein the controller is further configured to:

identify the fire alarm system device that sent the indication;

access the memory to determine whether previous configuration information is correlated to the identified fire alarm system device; and populate the form with the previous configuration information; and wherein the controller send the populated form to the wireless handheld device.

5. The fire alarm control panel of claim 4, wherein an indicator of the identity of the fire alarm system device is populated in the form.

6. The fire alarm control panel of claim 5, where the indicator of the identity of the fire alarm system device comprises a device type.

7. The fire alarm control panel of claim 2, wherein the modified form is at least partly different from the form.

8. The fire alarm control panel of claim 1, wherein the controller is further configured to configure the fire alarm system device with the information.

9. The fire alarm control panel of claim 1, wherein the controller is further configured to:

identify the fire alarm system device that sent the indication; and select the form, from a plurality of forms, based on identification of the fire alarm system device.

10. The fire alarm control panel of claim 9, wherein the identification of the fire alarm system device comprises a type of device; and wherein the form is selected based on the type of device.

11. The fire alarm control panel of claim 1, wherein the response comprises a tag identifying the wireless handheld device; and wherein the controller is configured to associate the tag with the at least a part of the information stored in the memory.

12. A method for a fire alarm control panel having a memory configured to store configuration information to control a plurality of fire alarm system devices, the method comprising:

receive an indication, via a first communications interface, of a user input from a fire alarm system device;

sending at least one communication responsive to receiving the indication, via a second communications interface, to a wireless handheld device proximal to the fire alarm system device;

receiving a response, via the second communications interface, from the wireless handheld device, the response including configuration information entered by a user; and updating the memory with at least a part of the configuration information.

13. The method of claim 12, wherein the at least one communication sent to the wireless handheld device comprises a form; and wherein the response comprises a modified form, the modified form having been modified by including information entered by the user.

14. The method of claim 13, wherein the first communications interface comprises a wired communications interface;

wherein the second communications interface comprises a wireless communications interface;

wherein the fire alarm control panel receives the indication of the user input from the fire alarm system device via the wired communications interface; and wherein the fire alarm control panel sends the form to the wireless handheld device via the wireless communications interface.

15. The method of claim 13, further comprising:

identifying the fire alarm system device that sent the indication;

accessing the memory to determine whether previous configuration information is correlated to the identified fire alarm system device; and populating the form with the previous configuration information; and wherein the fire alarm control panel sends the populated form to the wireless handheld device.

16. The method of claim 12, further comprising configuring the fire alarm system device with the information.

17. The method of claim 12, further comprising:

identifying the fire alarm system device that sent the indication; and selecting the form, from a plurality of forms, based on identification of the fire alarm system device.

18. The method of claim 17, wherein the identification of the fire alarm system device comprises a type of device; and wherein the form is selected based on the type of device.

19. The method of claim 12, wherein the response comprises a tag identifying the wireless handheld device; and wherein updating the memory comprises associating the tag with the at least a part of the information stored in the memory.

* * * * *